Dec. 18, 1945.  E. HERMANSEN  2,391,159

FLUID SEAL

Filed May 22, 1944

INVENTOR.

EVALD HERMANSEN

BY

*O. H. Fowler*

ATTORNEY

Patented Dec. 18, 1945

2,391,159

UNITED STATES PATENT OFFICE 2,391,159

FLUID SEAL

Evald Hermansen, Detroit, Mich., assignor to Bendix Aviation Corporation, Detroit, Mich., a corporation of Delaware Application May 22, 1944, Serial No. 536,800

2 Claims. (Cl. 286—1)

This invention relates to seals, and more particularly to seals for rotatable shafts.

In structures having a rotatable shaft extended through the wall of a case, considerable difficulty has been experienced in the provision of an adequate seal for inhibiting seepage of fluid and/or gas through the small clearance between the shaft and the case.

Heretofore various types of spring-pressed rubber bushings, fluid sealing cups, carbon rings, and other devices have been used with a small measure of success, but none has proved entirely satisfactory.

The instant invention aims to provide a highly efficient fluid seal for relatively rotatable members.

An object of the invention is to provide a fluid seal for a rotatable shaft extended through the wall of a case effective to inhibit seepage of fluid through an inherent clearance between the shaft and the case.

Another object of the invention is to provide a fluid seal for relatively rotatable parts effective to seal a clearance between the parts in both directions of rotation.

Other objects and advantages of the invention will appear from the following description when considered in connection with the accompanying drawing forming a part of this specification, and in which, Fig. 1 is a fragmentary sectional view of a case having a shaft extended through the wall thereof and a seal in the wall embracing the shaft;

Figures 1, 2:
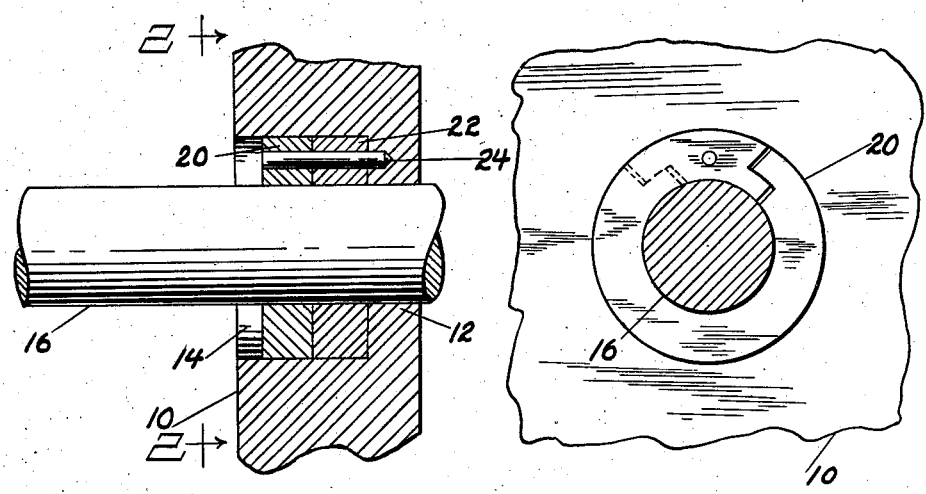
Fig. 2 is a vertical sectional view taken substantially on line 2—2, Fig. 1.
Figure 4:
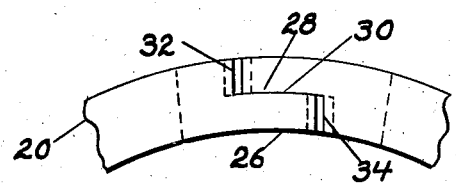
Fig. 4 is a fragmentary side elevation of one of the rings.
Figure 3:
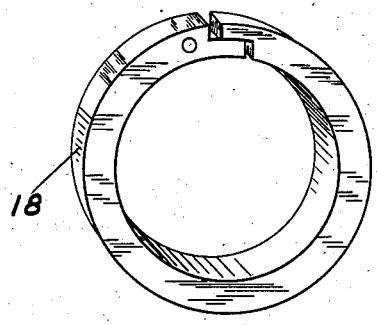
Fig. 3 is a perspective view of a split sealing ring.
Figure 5:
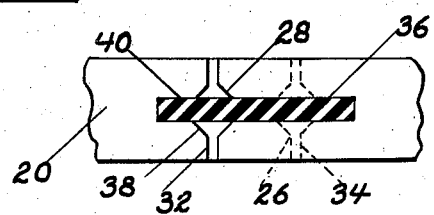
Fig. 5 is a fragmentary edge view of one of the rings illustrating a seal for the ring.

Referring to the drawing for more specific details of the invention, 10 represents a stationary case having in its wall an opening 12 and a bore 14 axially disposed with relation to the opening. A rotatable shaft 16 extended through the bore and opening fits the latter with small clearance. Normally this clearance is only sufficient to provide for free rotation of the shaft; however, in structures of this general type fluid inherently seeps through the clearance, and the instant invention aims to overcome this difficulty.

A split ring 18 embracing the shaft 16 has one of its ends pivoted to the case 10 by a pin so as to afford slight angular movement of the ring. This particular structure will effectively seal any clearance between the shaft and the wall of the case defining the opening 12. The inherent drag of the ring on the shaft during rotation thereof causes slight deformation or contraction of the ring, resulting in a tendency to close the gap between the adjacent ends thereof so that the ring may embrace the shaft with sufficient tightness to inhibit loss of fluid by seepage through the clearance.

In a preferred embodiment of the invention, a pair of split rings 20 and 22 are fitted in the bore 14 for the reception of the shaft 16, and the opposite ends of the rings are pivoted on a pin 24 mounted in the wall of the case 10. The split rings 20 and 22 are alike in structure, and, accordingly, a description of one will suffice for both.

As shown, the split ring 20 has overlapping end portions 26 and 28, slidably engaging one another as at 30, and providing oppositely arranged shoulders 32 and 34 in abutting relation with the end portions. The ring 20 is slotted transversely, as indicated at 36, and at the interceptions of the side wall of the slots and the end portions 26 and 28 and the shoulders 32 and 34 of the ring, the end portions and shoulders are beveled as indicated at 38. A strip of rubber 40 is vulcanized in the slot 36 so as to inhibit the passage of fluid transversely through the split portion of the ring. When the ring is contracted, the rubber is placed under compression and flows or spreads into the pockets provided by the beveled edges 38, with the result that the end portions and shoulders of the ring may abut one another without interference.

Upon rotation of the shaft 16 in either direction, at least one of the rings 20 or 22 imposes a drag on the shaft. This causes a slight contraction of the ring, with the result that the ring embraces the shaft with sufficient tightness to inhibit seepage of fluid through the clearance between the shaft 16 and the wall of the case defining the bore 12.

One of the characteristics of the seal is that the greater the speed of rotation of the shaft, the tighter the ring embraces the shaft. This is due to the duo servo action of the ring upon rotation of the shaft, and, since this action is afforded by either one or the other of the rings depending upon the direction of rotation of the shaft, a very highly efficient seal is provided.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid seal for a shaft extended through and rotatable in a wall, a pair of split rings sleeved on the shaft with the ends of one ring overlapping the ends of the other, and a pin supported in the wall extended transversely through the overlapping ends of the rings.

2. A fluid seal for a shaft extended through and rotatable in a wall comprising a pair of split rings sleeved on the shaft, rubber inserts spanning the gaps between the ends of the rings, the ends of one ring overlapping the ends of the other ring, and a pivot pin supported in the wall extended transversely through the overlapping ends of the rings.

EVALD HERMANSEN.